United States Patent
Yamamoto et al.

(10) Patent No.: US 10,291,080 B2
(45) Date of Patent: May 14, 2019

(54) ELECTRIC POWER TRANSMISSION DEVICE AND WIRELESS ELECTRIC POWER TRANSFER SYSTEM

(71) Applicant: Panasonic Intellectual Property Management Co., Ltd., Osaka (JP)

(72) Inventors: Hiroshi Yamamoto, Osaka (JP); Hiromu Matsumoto, Osaka (JP); Hiroshi Kanno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 15/810,859

(22) Filed: Nov. 13, 2017

(65) Prior Publication Data

US 2018/0278097 A1     Sep. 27, 2018

Related U.S. Application Data

(63) Continuation of application No. PCT/JP2017/021581, filed on Jun. 12, 2017.

(30) Foreign Application Priority Data

Mar. 24, 2017   (JP) .................. 2017-058686

(51) Int. Cl.
*H02J 50/70*      (2016.01)
*H02J 50/05*      (2016.01)
*H04B 5/00*       (2006.01)

(52) U.S. Cl.
CPC .............. *H02J 50/70* (2016.02); *H02J 50/05* (2016.02); *H04B 5/0037* (2013.01)

(58) Field of Classification Search
CPC . B60L 5/00; H01M 10/46; H02J 17/00; H02J 7/00; H02J 50/70; H02J 50/05; H04B 5/0037; Y02T 90/16
USPC ...... 333/24.3, 24 C, 24 R; 320/108; 307/104
See application file for complete search history.

(56) References Cited

U.S. PATENT DOCUMENTS

2015/0162753 A1\* 6/2015 Werner ................... H01F 41/02
                                                                307/104
2017/0229916 A1\* 8/2017 Matsumoto ............. H02J 50/80

FOREIGN PATENT DOCUMENTS

JP     2012-175869     9/2012

OTHER PUBLICATIONS

International Search Report of PCT application No. PCT/JP2017/021581 dated Jul. 11, 2017.

\* cited by examiner

*Primary Examiner* — Benny T Lee
*Assistant Examiner* — Hafizur Rahman
(74) *Attorney, Agent, or Firm* — Greenblum & Bernstein, P.L.C.

(57) ABSTRACT

An electric power transmission device includes a first power transmitting electrode, a second power transmitting electrode, a conductive first shield disposed between the first power transmitting electrode and the second power transmitting electrode, a conductive second shield that covers at least one of a first gap between the first power transmitting electrode and the first shield or a second gap between the second power transmitting electrode and the first shield, and a conductive third shield that covers at least one of a plurality of gaps between a plurality of divided portions of the second shield.

10 Claims, 10 Drawing Sheets

RELATED ART

RELATED ART

COMPARATIVE EXAMPLE 1
W1 = 150 mm
G1 = 140 mm
T1 = 0.2 mm

REFERENCE EXAMPLE
G2 = 125 mm
G3 = 0.3 mm
W2 = 138 mm
W3 = 15 mm
T2 = 0.2 mm

FIRST EMBODIMENT
G4 = 123 mm
G3 = G5 = 0.3 mm
W4 = 17 mm
W5 = 11 mm
W6 = W7 = 1 mm
T3 = 0.2 mm

ELECTRIC POWER TRANSMISSION DEVICE AND WIRELESS ELECTRIC POWER TRANSFER SYSTEM

BACKGROUND

1. Technical Field

The present disclosure relates to an electric power transmission device and a wireless electric power transfer system that transfers electric power wirelessly.

2. Description of the Related Art

In recent years, wireless electric power transfer technology for transferring electric power to a mobile product, such as a mobile phone or an electric car, wirelessly, that is, wirelessly, has been developed. Examples of wireless power transfer technology include electromagnetic induction and electric field coupling. Among the two, in electric field coupling, a pair of power transmitting electrodes and a pair of power receiving electrodes that face each other are used. By providing AC power to the pair of power transmitting electrode, electric power is transferred from the pair of power transmitting electrodes to the pair of power receiving electrodes wirelessly. Electric field coupling is used, to, for example, transmit electric power from a pair of power transmitting electrodes provided on the floor surface to a load, such as a motor provided in a vehicle. An example of a wireless electric power transfer system based on electric field coupling method mentioned above is described in Japanese Unexamined Patent Application Publication No. 2012-175869.

SUMMARY

In wireless electric power transfer by using an existing electric field coupling technique, leakage of an electric field may occur around a pair of power transmitting electrodes, which is problematic. One non-limiting and exemplary embodiment provides a technique capable of reducing leakage of the electric field around a power transmitting electrode.

In one general aspect, the techniques disclosed here feature an electric power transmission device including a first power transmitting electrode having a planar surface, a second power transmitting electrode having a planar surface and spaced from the first power transmitting electrode in a first direction that extends along the surface of the first power transmitting electrode, a power transmission circuit electrically connected to the first and second power transmitting electrodes and outputting AC power to the first and second power transmitting electrodes, a conductive first shield disposed between the first power transmitting electrode and the second power transmitting electrode so as to be spaced from each of the first power transmitting electrode and the second power transmitting electrode, a conductive second shield spaced from each of the first and second power transmitting electrodes in a second direction perpendicular to the surface of the first power transmitting electrode, where the second shield covers at least one of a first gap between the first power transmitting electrode and the first shield or a second gap between the second power transmitting electrode and the first shield, and a conductive third shield spaced from the second shield in the second direction. The second shield has at least three portions arranged in the first direction, and the at least three portions includes a first portion that covers one of the first and second gaps, a second portion that is spaced from the first portion by a third gap and that faces one of the first and second power transmitting electrodes, and a third portion that is spaced from the first portion by a fourth gap and that faces the first shield. The third shield covers at least one of the third gap or the fourth gap.

According to an aspect of the present disclosure, a wireless electric power transfer system based on the electric field coupling method can reduce leakage of an electric field around a power transmitting electrode and, thus, can increase the safety of the system.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Before describing the embodiments of the present disclosure, the underlying knowledge forming basis of the present disclosure is described.

The present inventors have found that the following problems occur with respect to the existing wireless electric power transfer system described in "Description of the Related Art".

Figure 1:
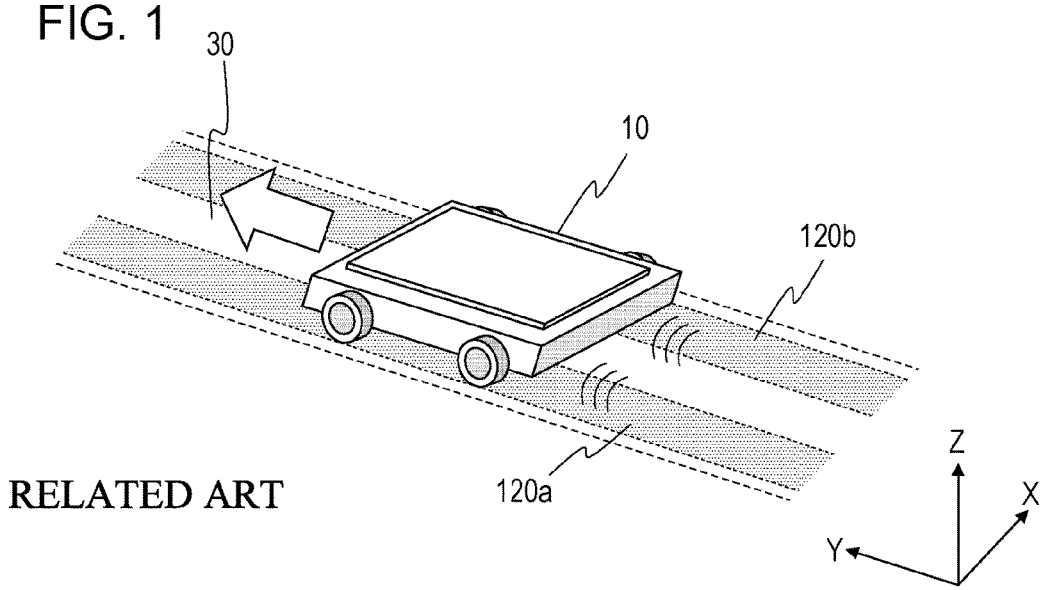
FIG. 1 is a schematic illustration of an example of a wireless electric power transfer system based on an electric field coupling method.

FIG. 1 is a schematic illustration of an example of a wireless electric power transfer system based on an electric field coupling method. The illustrated wireless electric power transfer system is a system that wirelessly transfers power to a transport robot 10, such as an automated guided vehicle (AGV) used for conveying all kinds of material/product in a factory. In this system, a pair of flat plate-like power transmitting electrodes 120a and 120b are disposed on the floor surface 30. The transport robot 10 has a pair of power receiving electrodes facing the pair of power transmitting electrodes 120a and 120b to receive AC power transmitted from the power transmitting electrodes 120a and 120b. The received electric power is supplied to a load of the transport robot 10, such as a motor or a secondary battery. In this manner, the transport robot 10 is driven or recharged.

Figure 2:
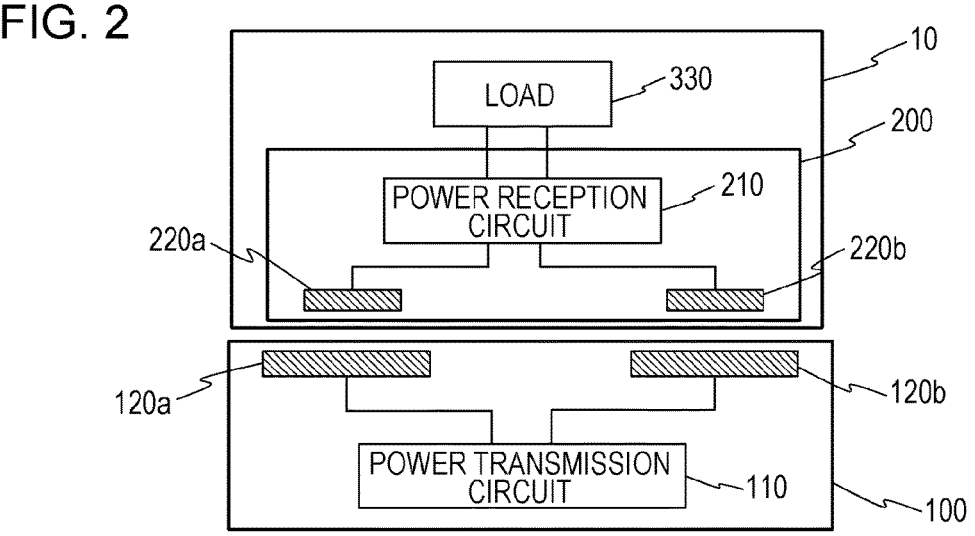
FIG. 2 is a schematic illustration of the configuration of the wireless electric power transfer system illustrated in FIG. 1.

FIG. 2 is a schematic illustration of the configuration of the wireless electric power transfer system illustrated in FIG. 1. The wireless electric power transfer system includes an electric power transmission device 100 and a transport robot 10. The electric power transmission device 100 includes a pair of power transmitting electrodes 120a and 120b and a power transmission circuit 110 that supplies AC power to the power transmitting electrodes 120a and 120b. An example of the power transmission circuit 110 is an AC output circuit including an inverter circuit. The transport robot 10 includes an electric power reception device 200 and a load 330. The electric power reception device 200 includes a pair of power receiving electrodes 220a and 220b and a power reception circuit 210 that converts the power received by the power receiving electrodes 220a and 220b into power required by the load 330 (for example, a DC voltage of a predetermined voltage) and supplies the power to the load 330. The power reception circuit 210 includes, for example, a rectifying circuit. The load 330 is a device that consumes electric power (e.g., a motor or a secondary battery). The power is transferred wirelessly by electric field coupling (hereinafter also referred to as "capacitive coupling") between the pair of power transmitting electrodes 120a and 120b and the pair of power receiving electrodes 220a and 220b facing each other.

The present inventors have found that in such a wireless electric power transfer system, electric field leakage occurs between the power transmitting electrodes 120a and 120b during power transmission, which may cause safety problems.

Figure 3:
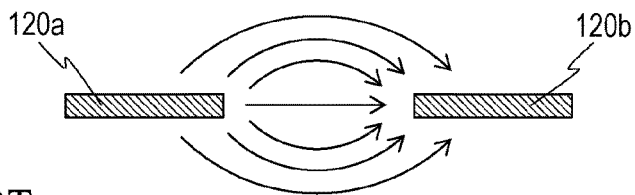
FIG. 3 illustrates a problem that occurs in the wireless electric power transfer system illustrated in FIG. 2.

FIG. 3 illustrates the electric field leakage problems that occur in the wireless electric power transfer system illustrated in FIG. 2. In FIG. 3, only the pair of power transmitting electrodes 120a and 120b among the components of the wireless electric power transfer system illustrated in FIG. 2 is illustrated. Arrows in FIG. 3 schematically represent the lines of electric force between the power transmitting electrodes 120a and 120b at a given moment. As illustrated in FIG. 3, a leakage electric field that does not contribute to power transmission is generated between the pair of power transmitting electrodes 120a and 120b. This leakage electric field increases with decreasing distance between the power transmitting electrodes 120a and 120b and with increasing power transmitted.

As described above, wireless electric power transfer systems based on the electric field coupling method can be suitably used for power feeding to a transport robot used in a factory, for example. The electric power transmitted in such a wireless electric power transfer system may be relatively large power, for example, greater than 1 kW. In such systems, the influence of the leakage electric field between the power transmitting electrodes 120a and 120b on the surrounding environment is likely to cause a problem.

Figure 4:
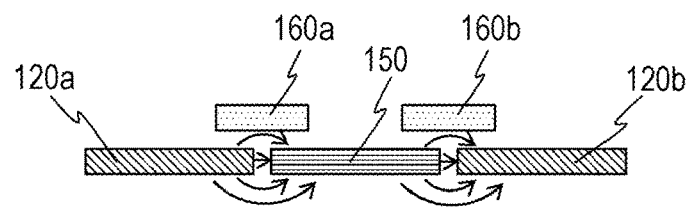
FIG. 4 is a schematic illustration of an example of a configuration in which conductive shields are disposed between power transmitting electrodes and above two gaps.

To reduce the leakage electric field, a conductive shield can be disposed between the power transmitting electrodes 120a and 120b, and another conductive shield that covers the gap between a first shield 150 and each of the power transmitting electrodes 120a and 120b and can be provided. FIG. 4 illustrates such a reference example.

In the reference example illustrated in FIG. 4, the first shield 150 having electrical conductivity is disposed between the power transmitting electrodes 120a and 120b so as to be spaced from each of the power transmitting electrodes 120a and 120b. Furthermore, conductive second shields 160a and 160b are disposed so as to respectively cover the gap between the power transmitting electrode 120a and the first shield 150 and the gap between the power transmitting electrode 120b and the first shield 150.

In the reference example of FIG. 4, by providing the first shield 150 and the second shields 160a and 160b, the number of portions where the electric field concentrates can be reduced more than in the configuration illustrated in FIG. 3. As a result, the safety can be improved.

However, in the configuration of the reference example, it was found that although the safety is improved, the transmission efficiency is reduced. The present inventors have found that the cause is that the capacitance component between the power transmitting electrodes 120a and 120b increases due to the first shield 150 and the second shields 160a and 160b.

Figure 5:
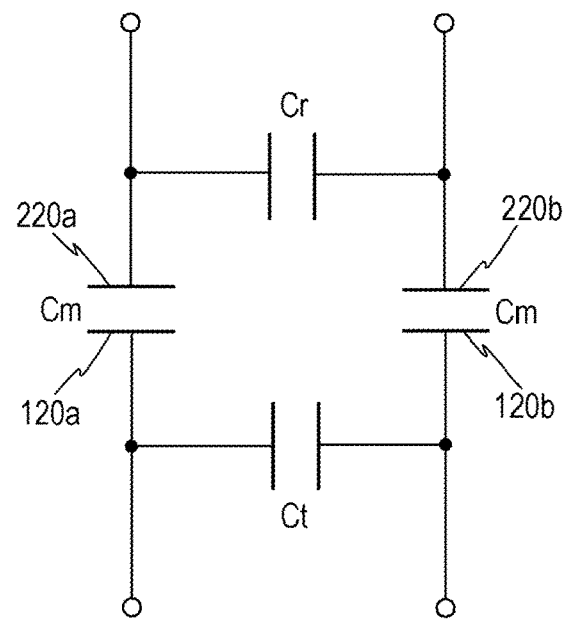
FIG. 5 is an equivalent circuit diagram of a circuit formed by the power transmitting electrodes and the power receiving electrodes.

FIG. 5 is an equivalent circuit diagram of a circuit formed by the power transmitting electrodes 120a and 120b and the power receiving electrodes 220a and 220b illustrated in FIG. 2 in the form of a combination of a plurality of capacitors. Each of a pair consisting of the power transmitting electrode 120a and the power receiving electrode 220a and a pair consisting of the power transmitting electrode 120b and the power receiving electrode 220b can be expressed as a capacitor of the capacitance Cm. It can be considered that a capacitor of capacitance Ct is present between the power transmitting electrodes 120a and 120b. In addition, it can be considered that a capacitor of capacitance Cr is present between the power receiving electrodes 220a and 220b.

Figure 6:
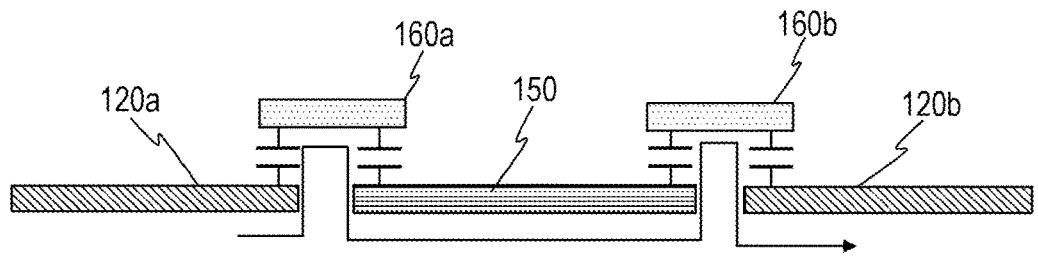
FIG. 6 illustrates capacitance components between the power transmitting electrodes in the configuration illustrated in FIG. 4.

FIG. 6 is a schematic illustration of the influence of the conductive first shield 150 and the conductive second shields 160a and 160b illustrated in FIG. 4. An arrow in FIG. 6 schematically illustrates the flow of energy through the first shield 150 and the second shields 160a and 160b. Unlike the configuration illustrated in FIG. 3, the first shield 150 and the second shields 160a and 160b are additionally provided in the configuration illustrated in FIG. 4. Accordingly, the capacitance Ct between the power transmitting electrodes 120a and 120b increases. Since the capacitance Cm is less likely to change, the energy easily flows between the power transmitting electrodes due to a reduction in impedance caused by an increase in the capacitance Ct. As a result, the energy transmitted to the power receiving electrodes 220a and 220b decreases, and the transmission efficiency decreases.

The present inventors have conceived the idea of reducing the leakage electric field and reducing a decrease in transmission efficiency by employing a shield structure which minimizes an increase in the capacitance Ct between the power transmitting electrodes, which results in the aspects of the present disclosure described below.

According to an aspect of the present disclosure, an electric power transmission device includes a first power transmitting electrode having a planar surface, a second power transmitting electrode having a planar surface and spaced from the first power transmitting electrode in a first direction that extends along the surface of the first power transmitting electrode, a power transmission circuit electrically connected to the first and second power transmitting electrodes, where the power transmission circuit outputs AC power to the first and second power transmitting electrodes, a conductive first shield disposed between the first power transmitting electrode and the second power transmitting electrode so as to be spaced from each of the first power transmitting electrode and the second power transmitting electrode, a conductive second shield spaced from each of the first and second power transmitting electrodes in a second direction perpendicular to the surface of the first power transmitting electrode, where the second shield covers at least one of a first gap between the first power transmitting electrode and the first shield or a second gap between the second power transmitting electrode and the first shield, and a conductive third shield spaced from the second shield in the second direction. The second shield has at least three portions arranged in the first direction, and the at least three portions includes a first portion that covers one of the first and second gaps, a second portion that is spaced from the first portion by a third gap and that faces one of the first and second power transmitting electrodes, and a third portion that is spaced from the first portion by a fourth gap and that faces the first shield. The third shield covers at least one of the third gap or the fourth gap.

According to the above aspect, the second shield includes at least three portions arranged in the first direction. The at least three portions include a first portion that covers one of the first and second gaps, a second portion that is spaced from the first portion by a third gap and that faces one of the first and second power transmitting electrodes, and a third portion that is spaced from the first portion by a fourth gap and that faces the first field. The third shield is spaced from the second shield in the second direction and covers at least one of the third gap or the fourth gap.

In this way, the second shield is divided into at least three portions, and at least one gap between the portions is covered by the third shield. By employing such a configuration, a capacitance Ct between the power transmitting electrodes can be reduced while maintaining the effect of reducing leakage of the electric field.

According to the present specification, "covering the gap by a shield or a portion of the shield" refers to a situation where the shield or a portion of the shield overlaps at least a portion of the gap, as viewed from a direction perpendicular to the surface of the electrode adjacent to the gap. For example, in the case where each of the power transmitting electrodes 120a and 120b and the first shield 150 illustrated in FIG. 4 has a flat plate-like structure extending in a direction perpendicular to the plane of FIG. 4, the gaps therebetween have straight-line shapes or belt-like shapes extending in that direction. The first portion of the second shield is disposed at a position so as to overlap part or the entirety of the gap having such an elongated shape. Similarly, it is only required that the third shield is disposed at a position so as to overlap at least part of the two gaps between the first to third portions of the second shield.

The gap between the first shield and each of the first and second power transmitting electrodes and the gaps between adjacent ones of the first to third portions of the second shield are not limited to air gaps. The gaps may be spaces filled with another electrically insulating material (for example, resin). The first and second power transmitting electrodes and each of the shields may be covered with an electrically insulating material, such as a dielectric material. For example, each of the shields may be produced by applying a metal, such as aluminum or copper, onto a single substrate.

More particular embodiments of the present disclosure are described below. Note that description that is more detailed than necessary is not given as needed. For example, detailed description of well-known matters and redundant description for substantially the same configuration are not given in some cases. This is to prevent the following description from being unnecessarily redundant and help those skilled in the art understand the present disclosure easily. It should be noted that the inventors provide the accompanying drawings and the following description in order to help those skilled in the art sufficiently understand the present disclosure and do not intend to limit the subject matter recited in claims. Throughout the following description, the same or similar constituent elements are denoted by the same reference numerals.

First Embodiment

Figure 7:
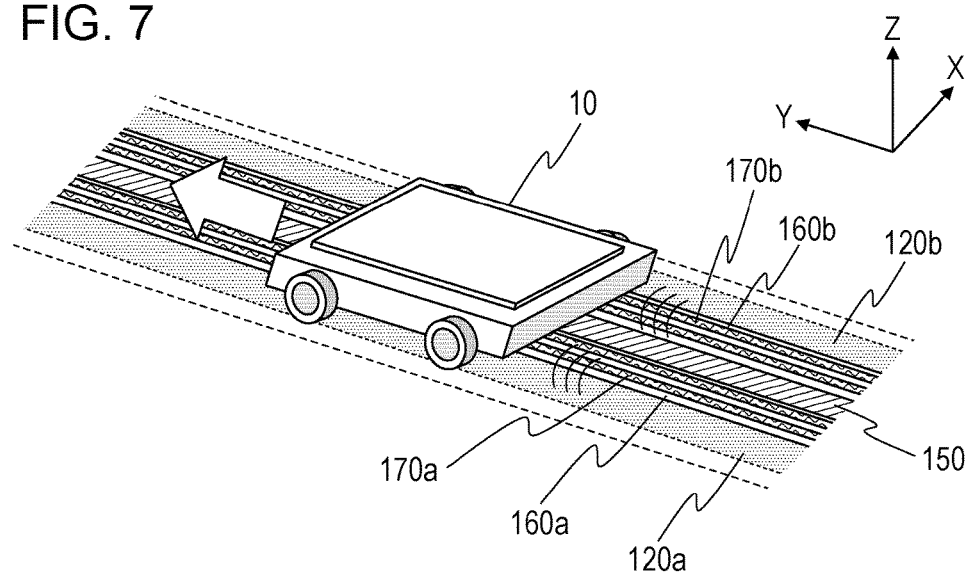
FIG. 7 is a schematic illustration of a wireless electric power transfer system according to a first embodiment of the present disclosure.

FIG. 7 is a schematic illustration of a wireless electric power transfer system according to a first embodiment of the present disclosure. Like the system illustrated in FIG. 1, in the system illustrated in FIG. 7, electric power is wirelessly transmitted from the electric power transmission device including a pair of power transmitting electrodes 120a and 120b disposed on or below a floor surface to the transport robot 10 including a pair of power receiving electrodes. The second power transmitting electrode 120b is spaced from the first power transmitting electrode 120a in a first direction (the X direction in this example) that extends along the surface of the first power transmitting electrode 120a.

The power transmitting electrodes 120a and 120b extend in parallel along the floor surface, and the transport robot 10 can move above the power transmitting electrodes 120a and 120b while receiving power.

In FIG. 7, XYZ-coordinate axes are illustrated, which indicate X, Y, Z directions orthogonal to one another. In the following description, the illustrated XYZ coordinates are used. The direction in which the power transmitting electrodes 120a and 120b, the first shield 150, the second shield 160, and the third shield 170 extend are the Y direction, and the direction perpendicular to the surfaces of the power transmitting electrodes 120a and 120b is the Z direction. The direction perpendicular to the Y direction and the Z direction is the X direction. In the present specification, the X direction is referred to as a first direction, the Z direction is referred to as a second direction, and the Y direction is referred to as a third direction. Note that the orientations of the structures illustrated in the drawings of the present application is determined in consideration of the ease of understanding of the description and do not limit the orientations when the embodiment of the present disclosure is actually implemented. In addition, the shape and size of the whole or a part of the structure illustrated in the drawings do not limit the actual shape and size.

Figure 8:
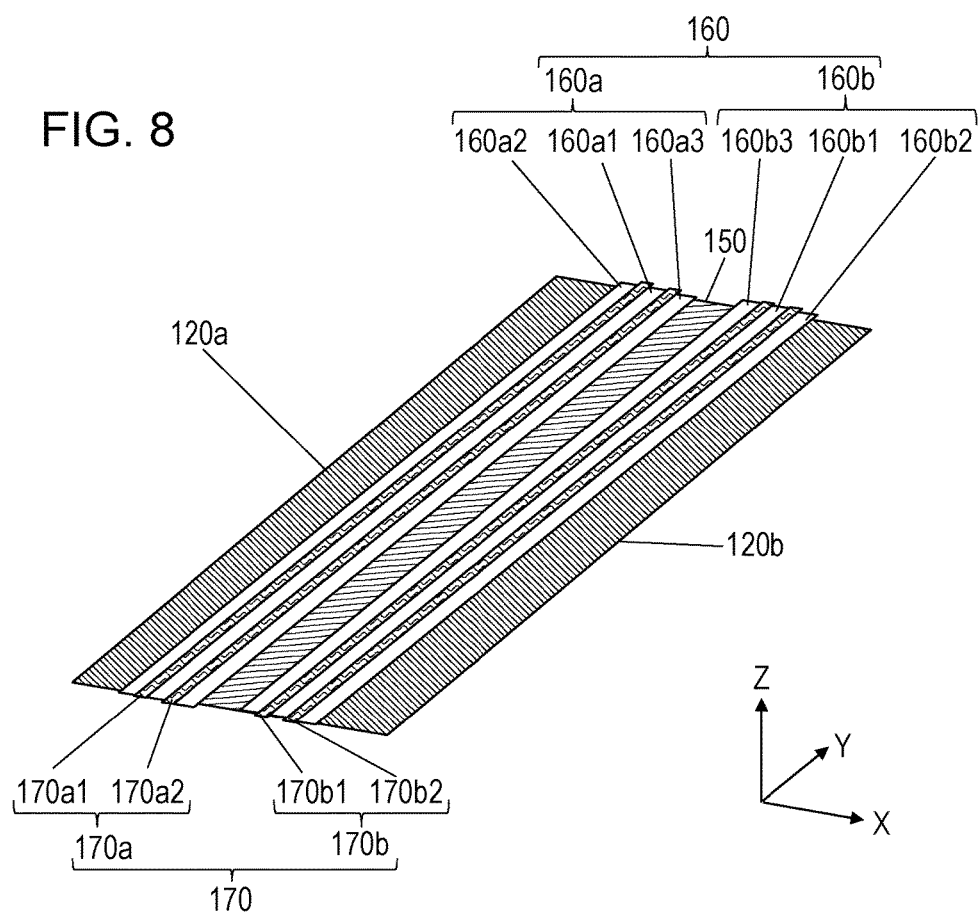
FIG. 8 is a perspective view schematically illustrating the arrangement of power transmitting electrodes, a first shield, a second shield, and a third shield according to the first embodiment.
Figure 9:
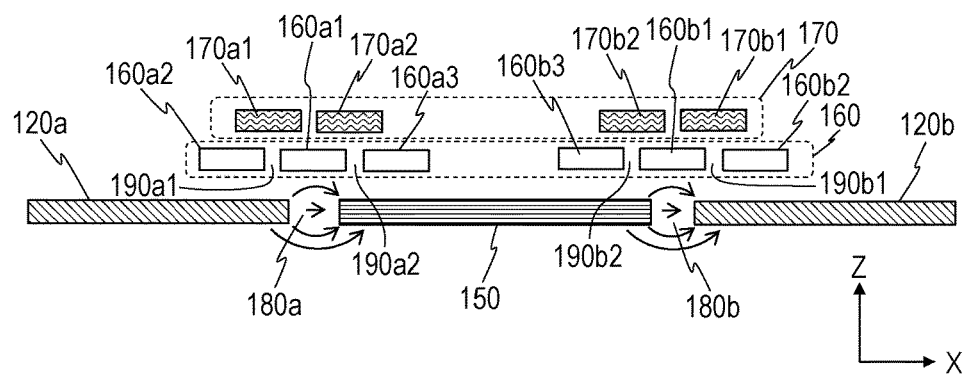
FIG. 9 is a schematic cross-sectional view, in a plane parallel to the XZ plane, of the power transmitting electrodes, the first shield, the second shield, and the third shield.

FIG. 8 is a perspective view schematically illustrating the arrangement of the power transmitting electrodes 120a and 120b, the first shield 150, the second shield 160, and the third shield 170 according to the present embodiment. FIG. 9 is a schematic cross-sectional view, in the XZ plane, of the arrangement of the power transmitting electrodes 120a and 120b, the first shield 150, the second shield 160, and the third shield 170.

Unlike the electric power transmission device illustrated in FIG. 4, in the electric power transmission device according to the present embodiment, each of the two portions 160a and 160b of the second shield 160 is divided into three portions, and the third shield 170 is disposed so as to cover the gaps between the portions.

As in the above-described reference example, each of the first power transmitting electrode 120a and the second power transmitting electrode 120b has a planar surface. As illustrated in FIG. 9, the second power transmitting electrode 120b is spaced from the first power transmitting electrode 120a in the first direction (the X direction) that extends along the surface of the first power transmitting electrode 120a. The power transmitting electrodes 120a and 120b are electrically connected to the power transmission circuit 110, as illustrated in FIG. 2. The power transmitting electrodes 120a and 120b receive AC power output from the power transmission circuit 110 and transmit the AC power to the power receiving electrodes 220a and 220b.

The first shield 150 having electrical conductivity is disposed between the first power transmitting electrode 120a and the second power transmitting electrode 120b. The first shield 150 is spaced from each of the first power transmitting electrode 120a and the second power transmitting electrode 120b. A gap between the first power transmitting electrode 120a and the first shield 150 is referred to as a first gap 180a. A gap between the second power transmitting electrode 120b and the first shield 150 is referred to as a second gap 180b.

The second shield 160 is spaced from the power transmitting electrodes 120a and 120b in a second direction (the Z direction) perpendicular to the surfaces of the power transmitting electrodes 120a and 120b. The second shield 160 covers the first gap 180a and the second gap 180b. More specifically, the second shield 160 includes six portions arranged in the first direction (the X direction). The six portions are a first portion 160a1, a second portion 160a2, a third portion 160a3, a fourth portion 160b1, a fifth portion 160b2, and a sixth portion 160b3. Among the six portions, the first portion 160a1 covers the first gap 180a, and the fourth portion 160b1 covers the second gap 180b. The second portion 160a2 and the third portion 160a3 are located on either side of the first portion 160a1. The fifth portion b2 and the sixth portion b3 are located on either side of the fourth portion 160b1.

The second portion 160a2 is spaced from the first portion 160a1 in the −X direction by a third gap 190a1. The second portion 160a2 faces the first power transmitting electrode 120a. The third portion 160a3 is spaced from the first portion 160a1 in the +X direction by a fourth gap 190a2. The third portion 160a3 faces the first shield 150.

The fifth portion 160b2 is spaced from the fourth portion 160b1 in the +X direction by a fifth gap 190b1. The fifth portion 160b2 faces the second power transmitting electrode 120b. The sixth portion 160b2 is spaced from the fourth portion 160b1 in the −X direction by a sixth gap 190b2. The sixth portion 160b2 faces the first shield 150.

The third shield 170 is spaced from the second shield 160 in the second direction (the Z direction). The third shield 170 includes four portions 170a1, 170a2, 170b1, and 170b2 that are spaced from each another and that respectively cover the third gap 190a1, the fourth gap 190a2, the fifth gap 190b1, and the sixth gap 190b2.

According to the present embodiment, the first to third portions 160a1, 160a2, and 160a3 of the second shield 160 are also collectively referred to as a second shield 160a. Likewise, the fourth to sixth portions 160b1, 160b2, and 160b3 of the second shield 160 are also collectively referred to as a second shield 160b. In addition, the portions 170a1 and 170a2 of the third shield 170 are also collectively referred to as a third shield 170a. Likewise, the portions 170b1 and 170b2 of the third shield 170 are also collectively referred to as a third shield 170b.

By employing the above configuration, the electric field generated above the gaps 180a and 180b during power transmission is shielded by the second shield 160 and the third shield 170 and, thus, the influence of the electric field is reduced.

Figure 10:
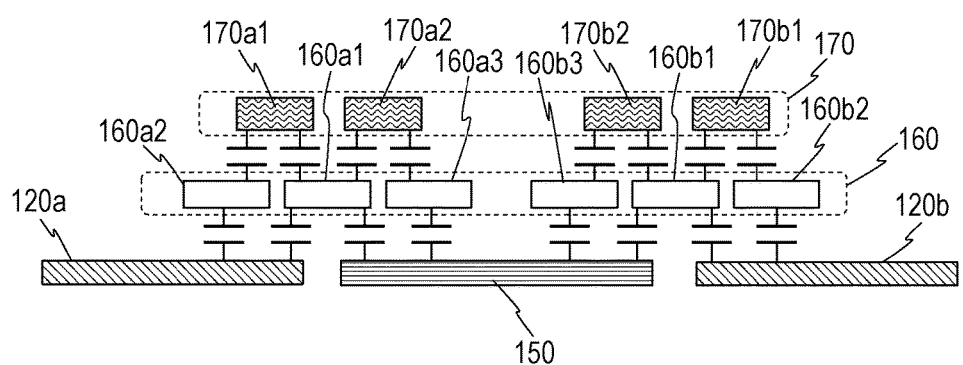
FIG. 10 illustrates capacitance components between the power transmitting electrodes according to the first embodiment.

FIG. 10 illustrates capacitance components between the power transmitting electrodes 120a and 120b according to the present embodiment. In FIG. 10, the primary ones of the capacitance components formed between the power transmitting electrodes 120a and 120b, the first shield 150, the second shield 160, and the third shield 170 are illustrated.

According to the present embodiment, it can be considered that the following capacitance components are connected in series: the capacitance component formed between the power transmitting electrode 120a and the second portion 160a2 of the second shield 160, the capacitance component formed between the second portion 160a2 of the second shield 160 and the first portion 170a1 of the third shield 170, the capacitance component formed between the first portion 170a1 of the third shield 170 and the first portion 160a1 of the second shield 160, and the capacitance component formed between the first portion 160a1 of the second shield 160 and the power transmitting electrode 120a. Thus, according to the present embodiment, the capacitance between the power transmitting electrode 120a and the second shield 160a is smaller than that in the reference example in FIG. 4. However, as viewed from the direction perpendicular to the power transmitting electrode 120a, the area of the portion of the second shield 160a that overlaps the power transmitting electrode 120a is the same as that in the reference example in FIG. 4.

Similarly, the capacitance between the first shield 150 and the second shield 160a is smaller than that in the reference example in FIG. 4. In addition, the capacitance between the power transmitting electrode 120b and the second shield 160b and the capacitance between the first shield 150 and the second shield 160b are also smaller than those in the reference example in FIG. 4.

As described above, according to the configuration of the present embodiment, the capacitance component between the conductive members that affect the transmission efficiency can be reduced. As a result, a decrease in the transmission efficiency can be reduced more than in the configuration illustrated in FIG. 4.

Figure 11A:
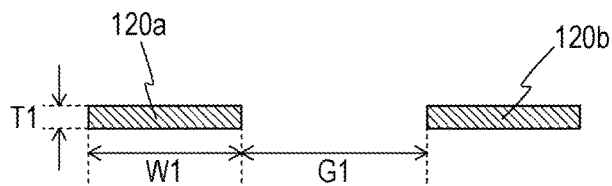
FIG. 11A illustrates the configuration and the dimensions of the units according to Comparative Example 1.
Figure 11B:
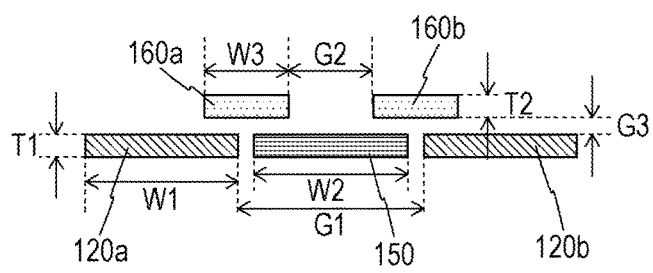
FIG. 11B illustrates the configuration and the dimensions of the units according to Reference Example.
Figure 11C:
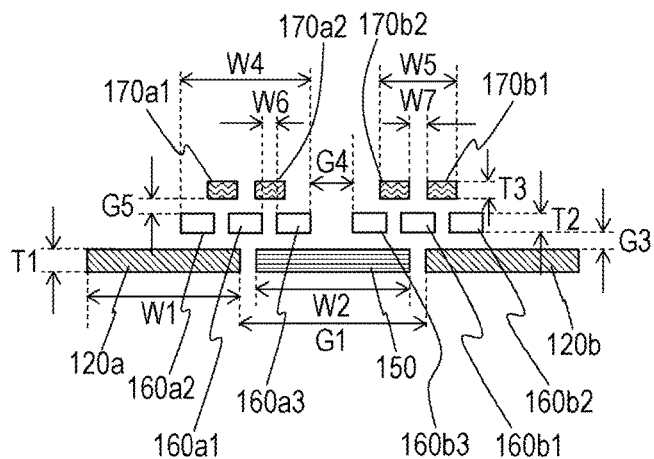
FIG. 11C illustrates the configuration and the dimensions of the units according to the first embodiment.

The present inventors calculated the values of the capacitances Ct, Cm and Cr illustrated in FIG. 5 by simulation analysis for each of the three configurations illustrated in FIGS. 11A, 11B and 11C. FIG. 11A illustrates Comparative Example 1 in which none of the conductive shields is disposed in the vicinity of the two power transmitting electrodes 120a and 120b. FIG. 11B illustrates Reference Example in which the first shield 150 is disposed between the two power transmitting electrodes 120a and 120b and, in addition, the second shields 160a and 160b that cover the two gaps are disposed. FIG. 11C illustrates the configuration according to the present embodiment. The sizes of the members and the arrangement of the members of each of the configurations are given in FIG. 11A to FIG. 11C.

The values of the capacitances Ct, Cm and Cr in each of the configurations are given in Table 1 below.

TABLE 1

| Configuration | Ct (pF) | Cm (pF) | Cr (pF) |
|---|---|---|---|
| FIG. 11A | 73 | 49 | 40 |
| FIG. 11B | 486 | 45 | 32 |
| FIG. 11C | 192 | 48 | 32 |

At this time, the length of each of the power transmitting electrodes 120a and 120b, the first shield 150, the second shield 160, and the third shield 170 in the Y direction is set to 5 m. The length of each of the power receiving electrodes 220a and 220b in the Y direction is set to 50 cm. The distance between the power transmitting electrodes 120a and 120b and the power receiving electrodes 220a and 220b, respectively, is set to 5 mm.

As can be seen from the results in Table 1, unlike the configuration illustrated in FIG. 11B, the configuration according to the present embodiment, that is, the configuration in which the second shield 160 is divided into a plurality of portions and, in addition, the third shield 170 is disposed is capable of reducing the capacitance Ct between the power transmitting electrodes.

Each of the constituent elements according to the present embodiment is described in more detail below.

According to the present embodiment, each of the power transmitting electrodes 120a and 120b, the first shield 150, the second shield 160, and the third shield 170 has a flat plate-like structure and has a planar surface. The power transmitting electrodes 120a and 120b, the first shield 150, the second shield 160, and the third shield 170 are made of a conductive material, such as copper or aluminum.

The shape and size of each of the constituent elements illustrated in FIG. 11C are only examples, and a variety of shapes and sizes may be selected in accordance with the intended use. An example of the dimensions of each of the constituent elements is described below. The width (the size in the X direction) of each of the power transmitting electrodes 120a and 120b and the first shield 150 can be set within a range of, for example, 5 cm or more to 200 cm or less. When the width of each of the power transmitting electrodes 120a and 120b is, for example, 15 cm, the length (the size in the Y direction) of each of the power transmitting electrodes 120a and 120b, the first shield 150, the portions 160a1, 160a2, 160a3, 160b1, 160b2, and 160b3 of the second shield, and the portions 170a1, 170a2, 170b1, and 170b2 of the third shield can be set within a range of, for example, 50 cm or more to 20 m or less. The width of each of the gap 180a between the power transmitting electrode 120a and the first shield 150 and the gap 180b between the power transmitting electrode 120b and the first shield 150 can be set within a range of, for example, 0.1 mm or more to 100 mm or less. Each of the distance between a surface of the power transmitting electrode 120a and one surface of the second shield 160a and the distance between a surface of the power transmitting electrode 120b and one surface of the second shield 160b, the distance between the other surface of the second shield 160a and a surface of the third shield 170a, and the distance between the other surface of the second shield 160b and a surface of the third shield 170b can be set within a range of, for example, 0.1 mm or more to 10 mm or less. The width of each of the portions 160a1, 160a2, 160a3, 160b1, 160b2, and 160b3 of the second shield can be set to a value larger than the width of each of the gaps 180a and 180b, for example. The width of each of the portions 160a1, 160a2, 160a3, 160b1, 160b2, 160b3 of the second shield can be set within a range of, for example, 10 mm or more to 500 mm or less. Each of the sum of the widths of the portions 160a1, 160a2, and 160a3 of the second shield and the sum of the widths of the portions 160b1, 160b2, and 160b3 may be larger or smaller than each of the widths of the power transmitting electrodes 120a and 120b and the first shield 150.

The width of each of the portions 170a1, 170a2, 170b1, and 170b2 of the third shield may be set to a value larger than a respective width of the gaps 190a1, 190a2, 190b1, and 190b2, for example. The width of each of the portions 170a1, 170a2, 170b1, and 170b2 of the third shield may be set within a range of, for example, 10 mm to 500 mm. The sum of the widths of the portions 170a1 and 170a2 and the sum of the widths of the portions 170b1 and 170b2 of the third shield may be larger or smaller than the width of each of the power transmitting electrodes 120a and 120b and the first shield 150.

The configuration of the wireless electric power transfer system according to the present embodiment is described in more detail below. The configuration of the system described below is merely an example and may be changed as appropriate in accordance with required functions and performance.

Figure 12:
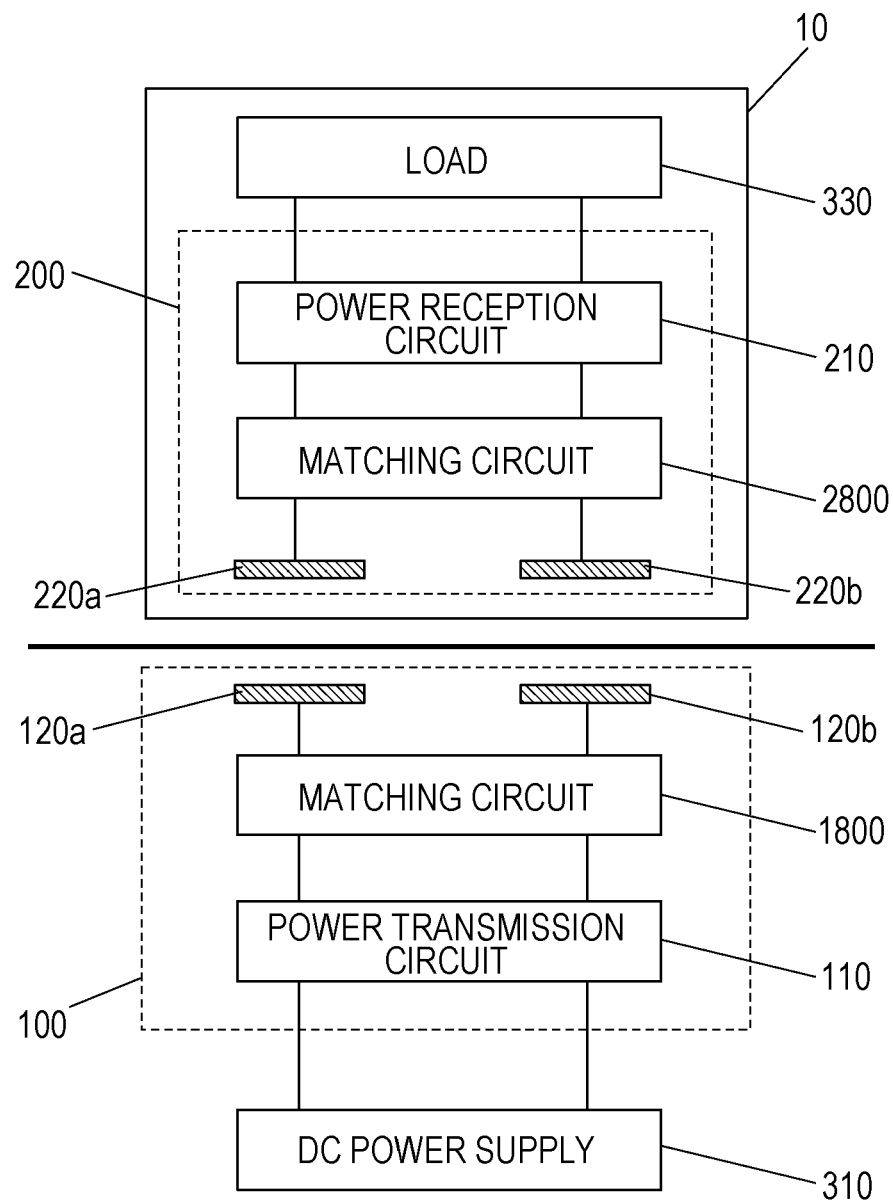
FIG. 12 is a block diagram of a schematic configuration of the wireless electric power transfer system according to the first embodiment.

FIG. 12 is a block diagram of a schematic configuration of the wireless electric power transfer system according to the present embodiment. The system includes an electric power transmission device 100 and a transport robot 10.

The electric power transmission device 100 includes a power transmission circuit 110 that convers DC power supplied from an external DC power supply 310 into AC power, two power transmitting electrodes 120a and 120b that transmit the AC power, and a matching circuit 1800 connected between the power transmission circuit 110 and each of the power transmitting electrodes 120a and 120b. According to the present embodiment, the power transmission circuit 110 is electrically connected to the first and second power transmitting electrodes 120a and 120b via the matching circuit 1800 and outputs the AC power to the first and second power transmitting electrodes 120a and 120b.

The transport robot 10 includes the electric power reception device 200 and the load 330. The electric power reception device 200 includes two power receiving electrodes 220a and 220b capacitively coupled with the two power transmitting electrodes 120a and 120b to receive power, a matching circuit 2800 connected to the two power receiving electrodes 220a and 220b, and a power reception circuit 210 connected to the matching circuit 2800. The matching circuit 2800 converts the received AC power into DC power and outputs the DC power. When facing the first power transmitting electrode 120a, the first power receiving electrode 220a forms a capacitive coupling with the first power transmitting electrode 120a. When facing the second power transmitting electrode 120b, the second power receiving electrode 220b forms a capacitive coupling with the second power transmitting electrode 120b. The AC power is transmitted from the electric power transmission device 100 to the electric power reception device 200 via the two capacitive couplings wirelessly. The load 330 includes, for example, a secondary battery and a motor. The load 330 is charged or driven by the DC power output from the power reception circuit 210.

Figure 13:
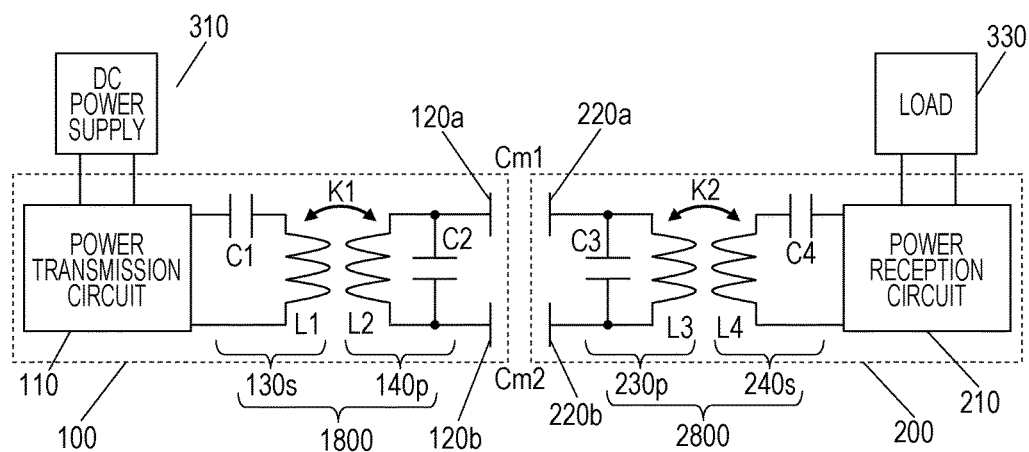
FIG. 13 is a circuit diagram illustrating an example of a more detailed configuration of the wireless electric power transfer system according to the first embodiment.

FIG. 13 is a circuit diagram illustrating an example of the configuration of the wireless electric power transfer system in more detail. In the illustrated example, the matching circuit 1800 in the electric power transmission device 100 includes a series resonance circuit 130s connected to the power transmission circuit 110. The matching circuit 1800 further includes a parallel resonance circuit 140p that is connected to the power transmitting electrodes 120a and 120b and that is inductively coupled with the series resonance circuit 130s. The matching circuit 1800 matches the impedance between the power transmission circuit 110 and the power transmitting electrodes 120a and 120b. The series resonance circuit 130s of the electric power transmission device 100 has a configuration in which a first coil L1 and a first capacitor C1 are connected in series. The parallel resonance circuit 140p of the electric power transmission device 100 has a configuration in which a second coil L2 and a second capacitor C2 are connected in parallel. The first coil L1 and the second coil L2 constitute a transformer in which the first coil L1 and the second coil L2 are coupled with a predetermined coupling coefficient. The winding ratio of the first coil L1 to the second coil L2 is set to a value that provides a desired transformer ratio (a step-up ratio or a step-down ratio).

The matching circuit 2800 of the electric power reception device 200 includes a parallel resonance circuit 230p connected to the power receiving electrodes 220a and 220b and a series resonance circuit 240s that is connected to the power reception circuit 210 and that is inductively coupled to the parallel resonance circuit 230p. The matching circuit 2800 matches the impedance between the power receiving electrodes 220a and 220b and the power reception circuit 210. The parallel resonance circuit 230p has a configuration in which a third coil L3 and a third capacitor C3 are connected in parallel. The series resonance circuit 240s of the electric power reception device 200 has a configuration in which a fourth coil L4 and a fourth capacitor C4 are connected in series. The third coil and the fourth coil constitute a transformer so as to be coupled with a predetermined coupling coefficient. The winding ratio of the third coil L3 to the fourth coil L4 is set to a value that provides a desired transformer ratio.

Note that the configurations of the matching circuits 1800 and 2800 are not limited to the configurations illustrated in FIG. 13. For example, a parallel resonance circuit may be provided instead of each of the series resonance circuits 130s and 240s. Alternatively, instead of each of the parallel resonance circuits 140p and 230p, a series resonance circuit may be provided. Still alternatively, one or both of the matching circuits 1800 and 2800 may be removed. If the matching circuit 1800 is removed, the power transmission circuit 110 and the power transmitting electrodes 120a and 120b are directly connected to each other. If the matching circuit 2800 is removed, the power reception circuit 210 and the power receiving electrodes 220a and 220b are directly connected to each other. In the present specification, the configuration in which the matching circuit 1800 is provided also corresponds to the configuration in which the power transmission circuit 110 and the power transmitting electrodes 120a and 120b are electrically connected to each other. Similarly, the configuration in which the matching circuit 2800 is provided also corresponds to a configuration in which the power reception circuit 210 and the power receiving electrodes 220a and 220b are electrically connected to each other.

Each of the constituent components is described in more detail below. In the present specification, reference symbols L1, L2, L3, and L4 representing inductors are also used as symbols representing the inductance values of the inductors. Similarly, reference symbols C1, C2, C3 and C4 representing capacitors are also used as symbols representing the capacitance value of the capacitors. In addition, let K1 denote the value of the coupling coefficient between the inductors L1 and L2, and let K2 denote the value of the coupling coefficient between the inductors L3 and L4.

Figure 14:
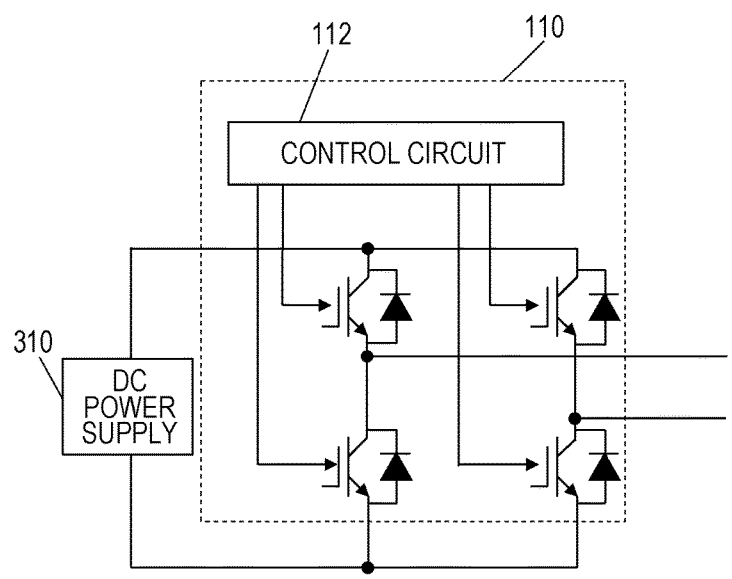
FIG. 14 is a schematic illustration of an example of the configuration of a power transmission circuit.

FIG. 14 is a schematic illustration of an example of the configuration of the power transmission circuit 110. In this example, the power transmission circuit 110 includes a full-bridge inverter circuit including four switching elements. The power transmission circuit 110 further includes a control circuit 112. Each of the switching elements can be configured by using transistors, such as IGBT or MOSFET. The control circuit 112 has a gate driver that outputs a control signal for controlling the conductive/non-conductive state of each of the switching elements and a processor that causes the gate driver to output the control signal. The processor may be, for example, a CPU in a microcontroller unit (MCU). Instead of the full-bridge inverter circuit illustrated in FIG. 14, a half-bridge inverter circuit or another oscillator circuit, such as a class-E oscillator circuit, may be employed.

The power transmission circuit 110 may have a modulation/demodulation circuit for communication and a variety of sensors for measuring the voltage, the current, and the like. When having a modulation/demodulation circuit for communication, data can be superimposed on the AC power and be transmitted to the electric power reception device 200. According to the present disclosure, a configuration is also provided to transmit an AC signal, such as a weak pulse signal, to the electric power reception device 200 for the purpose of transmitting data in addition to the purpose of transmitting electric power. Even in such a configuration, since weak power can be transmitted, transmitting weak AC power is encompassed in the concept of "power transmission" or "electric power transfer". In addition, such a weak AC signal is encompassed in the concept of "AC power".

Figure 15:
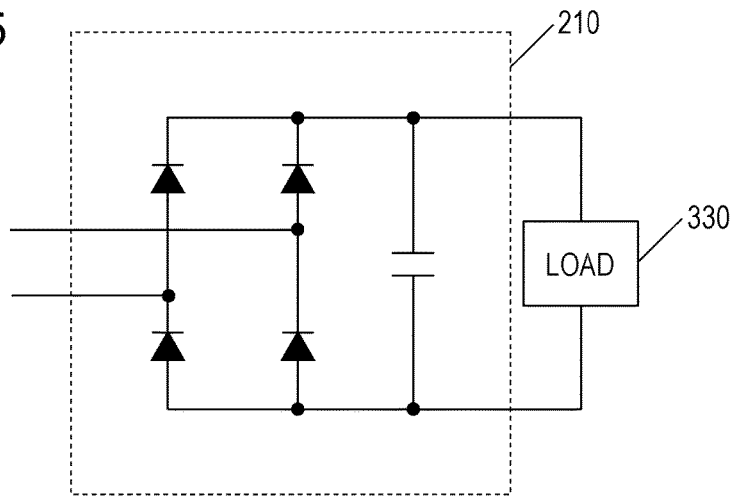
FIG. 15 is a schematic illustration of an example of the configuration of a power reception circuit.

FIG. 15 is a schematic illustration of an example of the configuration of the power reception circuit 210. In this example, the power reception circuit 210 is a full-wave rectifying circuit including a diode bridge and a smoothing capacitor. The power reception circuit 210 may have another rectifier configuration. In addition to the rectifying circuit, the power reception circuit 210 may include a variety of circuits, such as a constant voltage/constant current control circuit and a modulation/demodulation circuit for communication. The power reception circuit 210 converts the received AC energy into DC energy usable by the load 330. The power reception circuit 210 may further include a variety of sensors for measuring the voltage and the current output from the series resonance circuit 240s, for example.

Each of the coils in the series resonance circuit 130s, the parallel resonance circuit 140p, the parallel resonance circuit 230p, and the series resonance circuit 240s may be, for example, a planar coil or a laminated coil formed on a circuit board or a wire-wound coil using, for example, a copper wire, a litz wire or a twisted wire. Any type of capacitor having a chip shape or a lead shape can be used as the capacitors in each of the series resonance circuit 130s, the parallel resonance circuit 140p, the parallel resonance circuit 230p, and the series resonance circuit 240s. Alternatively, the capacitance between two interconnect wires with air therebetween may function as each of the capacitors. The self-resonance characteristic of each of the coils may be used instead of the capacitors.

Any type of power supply may be used as the DC power supply 310. Examples of the DC power supply 310 include a commercial power supply, a primary battery, a secondary battery, a solar cell, a fuel cell, a USB (Universal Serial Bus) power supply, a high capacitance capacitor (e.g., an electric double layer capacitor), and a voltage converter connected to a commercial power supply.

Typically, the resonance frequency f0 of each of the series resonance circuit 130s, the parallel resonance circuit 140p, the parallel resonance circuit 230p, and the series resonance circuit 240s is set so as to be the same as the transmission frequency f during power transmission. The resonance frequency f0 of each of the series resonance circuit 130s, the parallel resonance circuit 140p, the parallel resonance circuit 230p, and the series resonance circuit 240s need not be strictly the same as the transmission frequency f. Each of the resonance frequencies f0 may be set to a value within a range of about 50% to about 150% of the transmission frequency f, for example. The frequency f for the power transmission can be set to, for example, 50 Hz to 300 GHz and, in some example, to 20 kHz to 10 GHz. In another example, the frequency f can be set to 20 kHz to 20 MHz, and, in still another example, to 20 kHz to 1 MHz.

According to the present embodiment, a gap is formed between the power transmitting electrodes 120a and 120b and the power receiving electrodes 220a and 220b, and the distance is relatively long (for example, about 5 mm to about 20 mm). Consequently, each of the capacitance Cm1 and Cm2 between the electrodes is very small, and the impedance of the power transmitting electrodes 120a and 120b and the power receiving electrodes 220a and 220b is very high (for example, several kΩ). In contrast, the impedance of the power transmission circuit 110 and the power reception circuit 210 is low (for example, several Ω). According to the present embodiment, the parallel resonance circuit 140p is disposed close to the power transmitting electrodes 120a and 120b, and the parallel resonance circuit 230p is disposed close to the power receiving electrodes 220a and 220b. In addition, the series resonance circuit 130s is disposed close to the power transmission circuit 110, and the series resonance circuit 240s is disposed close to the power reception circuit 210. By using such a configuration, impedance matching can be easily achieved. Since the impedance of a series resonant circuit becomes zero (0) at resonance, a series resonant circuit is suitable for low impedance matching. In contrast, since the impedance of a parallel resonance circuit becomes infinite at resonance, a parallel resonance circuit is suitable for high impedance matching. Thus, like the configuration illustrated in FIG. 13, impedance matching can be easily achieved by providing a series resonant circuit adjacent to the low-impedance power supply and providing a parallel resonant circuit adjacent to the high-impedance electrode. Similarly, by providing a parallel resonance circuit adjacent to the electrode and providing a series resonance circuit adjacent to the load, impedance matching in the electric power reception device 200 can be easily achieved.

Note that the asymmetric resonance circuit configuration as described above is not an essential requirement. For example, in the configuration in which the distance between the power transmitting electrodes 120a and 120b and the power receiving electrodes 220a and 220b is decreased or the configuration in which a dielectric material is disposed between the power transmitting electrodes 120a and 120b and the power receiving electrodes 220a and 220b, the impedance of the electrodes is decreased. As a result, the need for the asymmetric resonance circuit configuration is eliminated. In addition, if a problem of impedance matching does not arise, the matching circuits 1800 and 2800 may be removed.

The present inventors obtained the transmission efficiency by simulation analysis in the case where each of the three configurations illustrated in FIG. 11A to FIG. 11C is applied to the wireless electric power transfer system illustrated in FIG. 13. In each of the configurations illustrated in FIG. 11A to FIG. 11C, a circuit constant that maximizes the transmission efficiency was obtained. Thereafter, the transmission efficiencies when power transmission was performed using the obtained circuit constants in the configurations illustrated in FIG. 11A to FIG. 11C were evaluated. The analysis results are given in Table 2 below.

TABLE 2

| Configuration | Highest Transmission Efficiency (%) | Amount of Efficiency Change |
|---|---|---|
| FIG. 11A | 88.5 | — |
| FIG. 11B | 82.5 | −6.0% |
| FIG. 11C | 87.6 | −0.9% |

In Table 2, the amount of efficiency change indicates the amount of change in the highest transmission efficiency when the configuration illustrated in FIG. 11A is used as a reference. The highest transmission efficiency is the transmission efficiency when the circuit constants that maximize the transmission efficiency are used in the configurations of FIG. 11A to FIG. 11C. The circuit constants used in the configurations are given in Table 3 below.

TABLE 3

| Configuration | C1 | L1 | K1 | L2 | C2 | C3 | L3 | K2 | L4 | C4 |
|---|---|---|---|---|---|---|---|---|---|---|
| FIG. 11A | 29,000 | 3 | 0.7 | 285 | 120 | 40 | 285 | 0.8 | 28 | 3,000 |
| FIG. 11B | 5,783 | 9 | 0.8 | 109 | 0 | 69 | 285 | 0.8 | 30 | 2,407 |
| FIG. 11C | 28,000 | 3 | 0.7 | 280 | 98 | 55 | 285 | 0.8 | 29 | 2,831 |

In Table 3, the unit of the capacitance value is pF, the unit of the inductance value is µH. The transmission frequency is 490 kHz, and the load value is 40Ω.

As can be seen from the results in Table 2, according to the configuration of the present embodiment, a decrease in transmission efficiency can be reduced more than that of the configuration illustrated in FIG. 11B.

As described above, according to the electric power transmission device of the present embodiment, in addition to leakage of the electric field between the first and second power transmitting electrodes 120a and 120b, leakage of the electric fields in the vicinity of the two gaps 180a and 180b can be reduced. Furthermore, the capacitance generated between the power transmitting electrodes 120a and 120b can be reduced. As a result, the safety of the wireless electric power transfer systems based on the electric field coupling method can be improved while maintaining the transmission efficiency.

According to the present embodiment, the following two-layer shield configuration is employed. That is, each of the portions 160a and 160b disposed on one side of the second shield is divided into three portions, and the third shield 170 covers the gaps between the portions. The present disclosure is not limited to such a configuration. For example, a configuration illustrated in FIG. 16 may be employed. In the example illustrated in FIG. 16, one side portion of the second shield 160 is divided into five portions. One side portion of the third shield 170 is divided into four portions each of which covers one of the four gaps formed in the second shield 160. An additional shield 172 is disposed at a position so as to cover three gaps between the four portions. As in this example, a shield configuration of three layers or four or more layers may be employed. That is, the number of divisions of the second shield 160 and the third shield 170 may be increased to increase the number of conductive shields to be overlaid. Even in such a configuration, effects the same as those of the present embodiment can be obtained.

Second Embodiment

Figure 17:
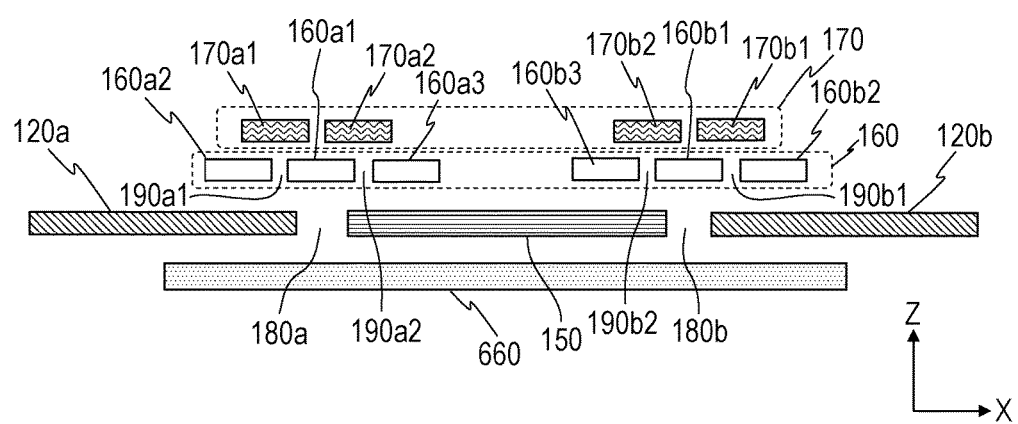
FIG. 17 is a cross-sectional view schematically illustrating the configurations of power transmitting electrodes, a first shield, a second shield, a third shield, and a fourth shield according to a second embodiment of the present disclosure.

FIG. 17 is a cross-sectional view schematically illustrating the configuration of the second embodiment of the present disclosure. The electric power transmission device according to the present embodiment further includes a conductive fourth shield 660 which is positioned away from the first and second power transmitting electrodes 120a and 120b in a direction opposite the second direction (the −Z direction). The single fourth shield 660 covers both of the two gaps 180a and 180b on the lower side with respect to the power transmitting electrodes 120a and 120b. As used herein, the term "lower side" refers to the side opposite to the side on which the power receiving electrodes 220a and 220b are disposed. The other configurations are the same as those of the first embodiment.

By providing the fourth shield 660 as in the present embodiment, leakage of the electric field on the lower side can be reduced more than in the first embodiment.

The fourth shield 660 may cover only one of the gaps 180a and 180b. Even in such a case, the effect of reducing the leakage of the electric field in the lower portion of the one of the gaps can be obtained.

According to the present embodiment, conductive shields are disposed on both upper and lower sides of the power transmitting electrodes 120a and 120b and the first shield 150. By employing such a configuration, leakage of the electric field can be reduced more. By placing the fourth shield 660 under the gaps 180a and 180b, variation of the impedance of the electrode caused by, for example, the influence of metal disposed under the floor surface can be reduced. Furthermore, the influence of the electric field on, for example, an animal present below the floor surface can be reduced.

Third Embodiment

Figure 18:
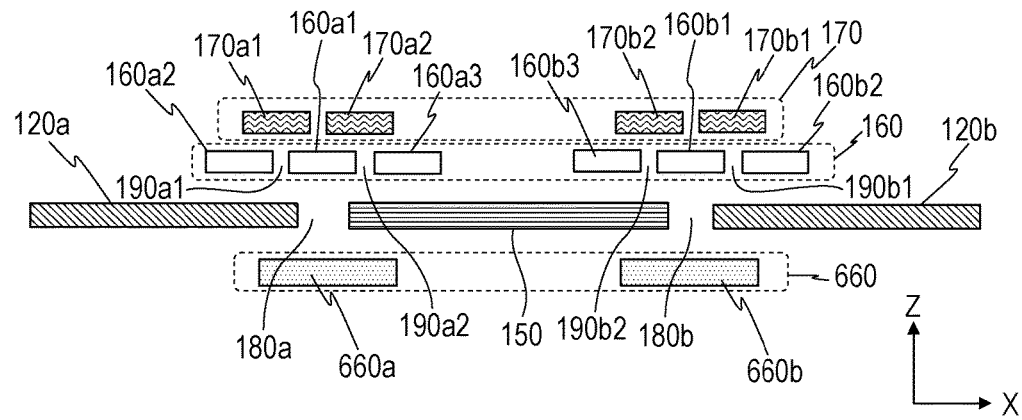
FIG. 18 is a cross-sectional view schematically illustrating the configurations of power transmitting electrodes, a first shield, a second shield, a third shield, and a fourth shield according to a third embodiment of the present disclosure.

FIG. 18 is a cross-sectional view schematically illustrating the configuration of the third embodiment of the present disclosure. The electric power transmission device according to the present embodiment further includes a conductive fourth shield 660 which is positioned away from the first and second power transmitting electrodes 120a and 120b in a direction opposite to the second direction (the −Z direction). The fourth shield 660 is divided into a portion 660a that covers the first gap 180a and a portion 660b that covers the second gap 180b. The other configurations are the same as those of the first embodiment.

According to the present embodiment, the fourth shield 660 has two portions 660a and 660b that cover the gaps 180a and 180b, respectively. The fourth shield 660 may have only one of the two portions 660a and 660b. Even in such a case, leakage of the electric field in the lower portion of the one of the gaps can be reduced.

According to the present embodiment, conductive shields are disposed on both the upper and lower sides of the power transmitting electrodes 120a and 120b and the first shield 150. By employing such a configuration, leakage of the electric field can be reduced more. In addition, the capacitance generated between the power transmitting electrodes 120a and 120b can be reduced more than that in the configuration of the second embodiment. By placing the portions 660a and 660b of the fourth shield under the gaps 180a and 180b, respectively, variation of the impedance of the electrode caused by, for example, the influence of metal disposed under the floor surface can be reduced. Furthermore, the influence of the electric field on, for example, an animal present below the floor surface can be reduced.

Fourth Embodiment

Figure 19:
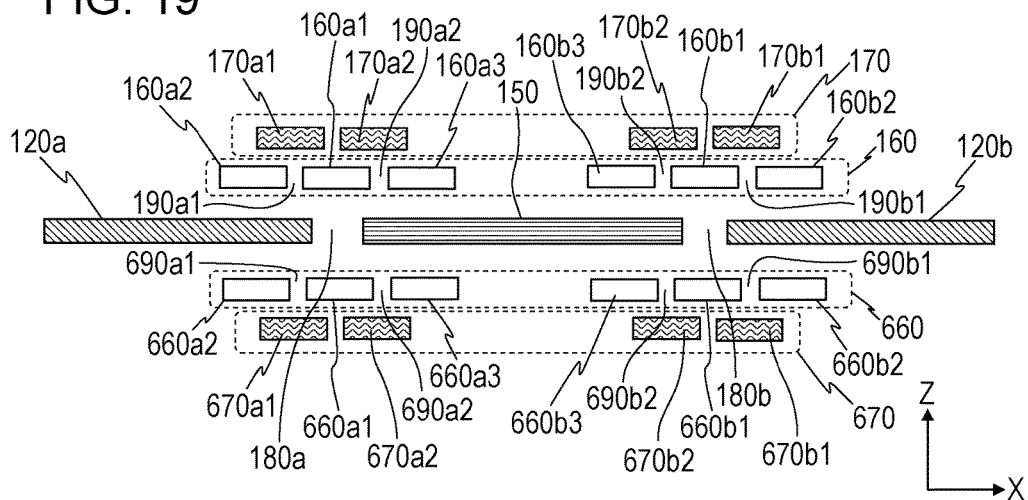
FIG. 19 is a cross-sectional view schematically illustrating power transmitting electrodes, a first shield, a second shield, a third shield, a fourth shield, and a fifth shield according to a fourth embodiment of the present disclosure.

FIG. 19 is a schematic illustration of the configuration according to the fourth embodiment of the present disclosure. Unlike the configuration according to the third embodiment, according to the present embodiment, each of the portions 660a and 660b of the fourth shield is divided into three portions, and a fifth shield 670 that covers the gaps between the portions is further provided. The other configurations are the same as those according to the third embodiment.

According to the present embodiment, the electric power transmission device 100 includes a conductive fourth shield 660 and a conductive fifth shield 670 on the lower side with respect to the power transmitting electrodes. The fourth shield 660 includes six portions arranged in the first direction (the X direction). The six portions are a seventh portion 660a1, an eighth portion 660a2, a ninth portion 660a3, a tenth portion 660b1, an eleventh portion 660b2, and a twelfth portion 660b3. The seventh portion 660a1 covers the first gap 180a. The eighth portion 660a2 is spaced from the seventh portion 660a1 by a seventh gap 690a1 and faces the first power transmitting electrode 120a. The ninth portion 660a3 is spaced from the seventh portion 660a1 by an eighth gap 690a2 and faces the first shield 150. The tenth portion 660b1 covers the second gap 180b. The eleventh portion 660b2 is spaced from the tenth portion 660b1 by a ninth gap 690b1 and faces the second power transmitting electrode 120b. The twelfth portion 660b3 is spaced from the tenth portion 660b1 by a tenth gap 690b2 and faces the first shield 150.

The fifth shield 670 is spaced from the fourth shield 660 in a direction opposite to the second direction (the −Z direction). The fifth shield 670 includes four portions 670a1, 670a2, 670b1, and 670b2 that are spaced from each other and cover the gaps 690a1, 690a2, 690b1, and 690b2, respectively.

According to the present embodiment, the configuration of the fourth shield 660 and the fifth shield 670 is symmetrical to the configuration of the second shield 160 and the third shield 170 with respect to a plane that is parallel to the XY plane and that passes through the center of the power transmitting electrodes 120a and 120b.

By employing such a configuration, the capacitance components between the power transmitting electrodes can be reduced more than in the configuration of the third embodiment illustrated in FIG. 18. Since the shields 660 and 670 are also disposed under the gaps 180a and 180b, respectively, variation of the impedance of the electrode caused by, for example, the influence of metal disposed under the floor surface can be reduced. Furthermore, the influence of the electric field on, for example, an animal present below the floor surface can be reduced.

Other Embodiments

According to the above embodiments, the power transmitting electrodes 120a and 120b, the first shield 150, the portions of the second shield 160, the portions of the third shield 170, the portions of the fourth shield 660, and the portions of the fifth shield 670 each has a flat plate-like shape. However, the shape may be another shape. For example, each of the electrodes or each of the shields may have a shape of a curved surface or a shape having irregularities. Each of the electrodes and each of the shields do not need to be arranged along a floor or the ground and may be inclined with respect to a floor or the ground.

Figure 16:
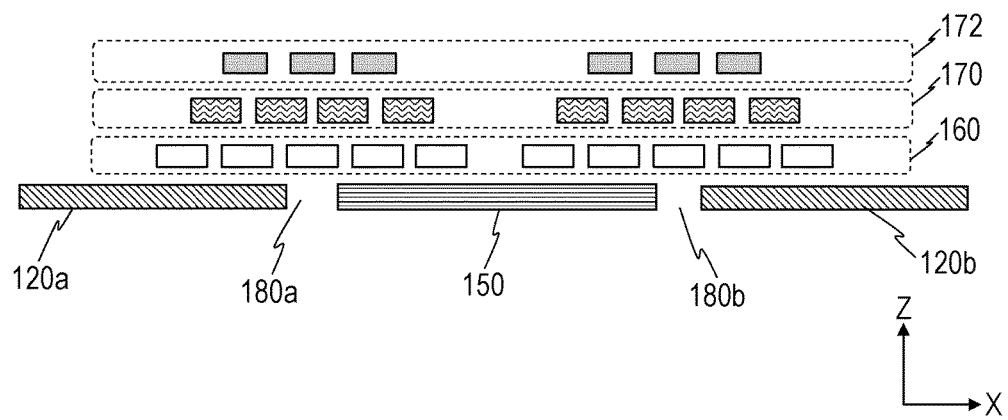
FIG. 16 is a cross-sectional view illustrating a modification of the first embodiment.
Figure 20:
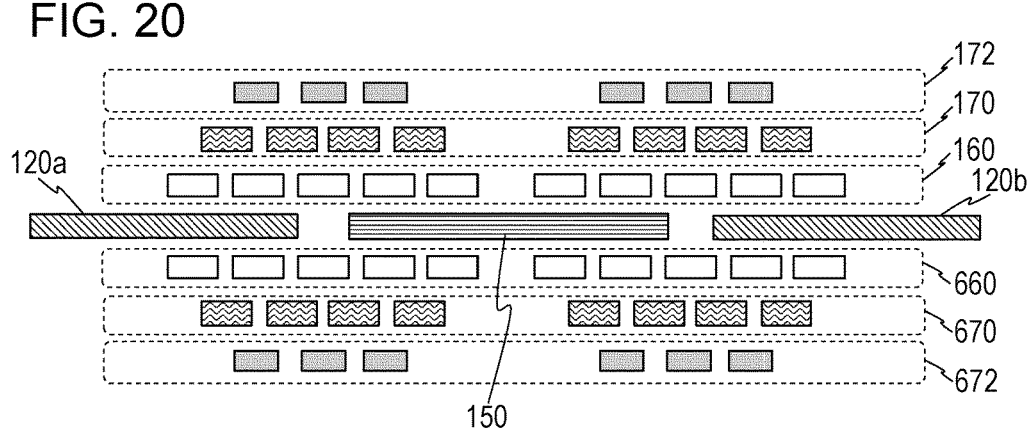
FIG. 20 is a cross-sectional view illustrating the configuration according to another embodiment of the present disclosure.
Figure 21A:
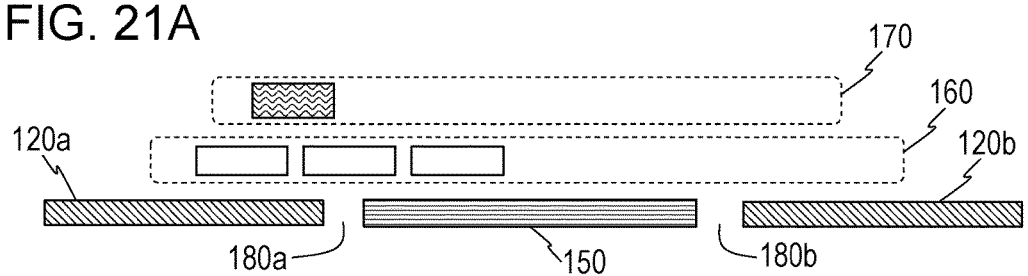
FIG. 21A is a cross-sectional view illustrating the configuration according to still another embodiment of the present disclosure.
Figure 21B:
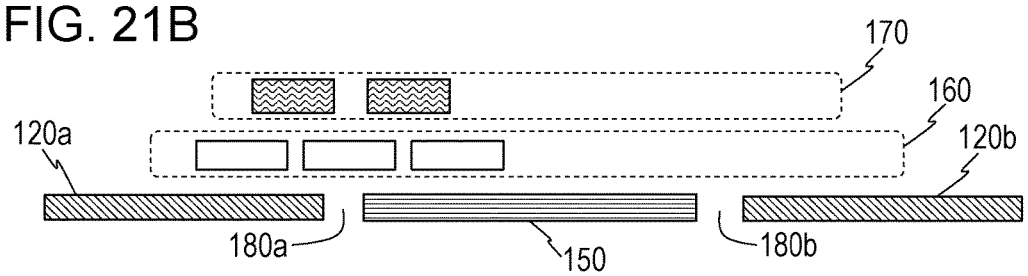
FIG. 21B is a cross-sectional view illustrating the configuration according to yet still another embodiment of the present disclosure.
Figure 21C:
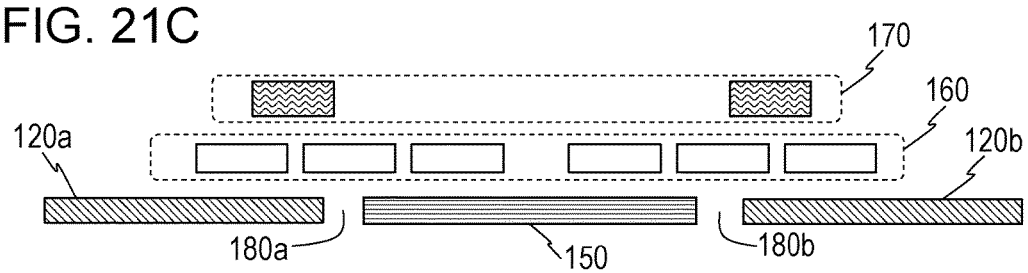
FIG. 21C is a cross-sectional view illustrating the configuration according to yet still another embodiment of the present disclosure.
Figure 21D:
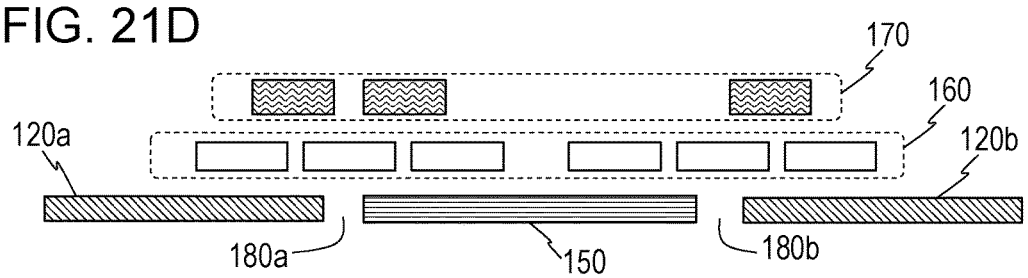
FIG. 21D is a cross-sectional view illustrating the configuration according to yet still another embodiment of the present disclosure.

A shield structure similar to the structure of the shields 160, 170, and 172 illustrated in FIG. 16 may be provided under the power transmitting electrodes 120a and 120b. For example, a shield structure as illustrated in FIG. 20 may be employed. In the configuration illustrated in FIG. 20, the electric power transmission device has shields 160, 170, and 172 on the upper side and shields 660, 670, and 672 on the lower side. The upper shields 160, 170, 172 and the lower shields 660, 670, 672 are arranged symmetrically with respect to the plane on which the power transmitting electrodes 120a and 120b are placed. By employing such a configuration, leakage of the electric field can be reduced more while reducing a decrease in transmission efficiency.

According to the first to fourth embodiments described above, the second shield 160 includes six portions. According to the embodiment illustrated in FIG. 20, the second shield 160 includes ten portions. However, at least three portions are sufficient for the second shield 160. The at least three portions need to include a first portion that covers the first gap 180a or the second gap 180b, a second portion that is spaced from the first portion by a third gap and that faces the first power transmitting electrode 120a or the second power transmitting electrode 120b, and a third portion that is spaced from the first portion by a fourth gap and that faces the first shield 150. In addition, it is not an essential requirement that the third shield 170 includes four or eight portions arranged in the X direction. It is only required that the third shield 170 covers at least one of the third gap or the fourth gap in the second shield 160. For example, the configuration illustrated in each of FIG. 21A to FIG. 21D may be employed. A similar configuration can be applied to the fourth shield 660 and the fifth shield 670 under the power transmitting electrodes 120a and 120b.

As described above, the present disclosure includes the electric power transmission devices and the wireless electric power transfer system in the items described below.

Item 1

An electric power transmission device includes a first power transmitting electrode having a planar surface, a second power transmitting electrode has a planar surface and spaced from the first power transmitting electrode in a first direction that extends along the surface of the first power transmitting electrode, a power transmission circuit electrically connected to the first and second power transmitting electrodes and outputting AC power to the first and second power transmitting electrodes, a conductive first shield disposed between the first power transmitting electrode and the second power transmitting electrode so as to be spaced from each of the first power transmitting electrode and the second power transmitting electrode, a conductive second shield spaced from each of the first and second power transmitting electrodes in a second direction perpendicular to the surface of the first power transmitting electrode, where the second shield covers at least one of a first gap between the first power transmitting electrode and the first shield or a second gap between the second power transmitting electrode and the first shield, and a conductive third shield spaced from the second shield in the second direction. The second shield has at least three portions arranged in the first direction, and the at least three portions includes a first portion that covers one of the first and second gaps, a second portion that is spaced from the first portion by a third gap and that faces one of the first and second power transmitting electrodes, and a third portion that is spaced from the first portion by a fourth gap and that faces the first shield. The third shield covers at least one of the third gap or the fourth gap.

Item 2

In the electric power transmission device according to item 1, each of the first power transmitting electrode and the second power transmitting electrode extends in a third direction perpendicular to each of the first and second directions.

Item 3

In the electric power transmission device according to item 2, at least one of the first shield, the second shield, or the third shield extends in the third direction.

Item 4

In the electric power transmission device according to any one of Items 1 to 3, the surface of the first power transmitting electrode and the surface of the second power transmitting electrode are coplanar.

Item 5

In the electric power transmission device according to any one of Items 1 to 4, the second shield covers both the first gap and the second gap.

Item 6

In the electric power transmission device according to any one of items 1 To 5, the second shield includes at least six portions arranged in the first direction. The at least six portions include the first portion, the second portion, the third portion, a fourth portion, a fifth portion, and a sixth portion, where the first portion covers the first gap, the second portion is spaced from the first portion by the third gap and faces the first power transmitting electrode, the third portion is spaced from the first portion by the fourth gap and faces the first shield, the fourth portion covers the second gap, the fifth portion is spaced from the fourth portion by the fifth gap and faces the second power transmitting electrode, the sixth portion is spaced from the fourth portion by a sixth gap and faces the first shield, and the third shield includes four portions spaced each other, each of four portions covering a respective third to sixth gaps.

Item 7

In the electric power transmission device according to any one of Items 1 to 6, the electric power transmission device further includes a conductive fourth shield spaced from the first and second power transmitting electrodes in a direction opposite to the second direction, and the fourth shield covers at least one of the first or second gaps.

Item 8

In the electric power transmission device according to Item 7, the fourth shield includes a portion that covers the first gap and a portion that covers the second gap.

Item 9

In the electric power transmission device according to Item 7 or 8, the fourth shield includes at least six portions arranged in the first direction, where the at least six portions include a seventh portion that covers the first gap, an eighth portion that is spaced from the seventh portion by a seventh gap and that faces the first power transmitting electrode, a ninth portion that is spaced from the seventh portion by an eighth gap and that faces the first shield, a tenth portion that covers the second gap, an eleventh portion that is spaced from the tenth portion by a ninth gap and that faces the second power transmitting electrode, and a twelfth portion that is spaced from the tenth portion by a tenth gap and that faces the first shield, and the electric power transmission device further includes a conductive fifth shield spaced from the fourth shield in the direction opposite to the second direction. The fifth shield includes four portions spaced from each other, each of the four portions covering a respective seventh to tenth gaps.

Item 10

A wireless electric power transfer system includes the electric power transmission devices according to any one of Items 1 to 9 and an electric power reception device. The electric power reception device includes a first power receiving electrode that forms a capacitive coupling with the first power transmitting electrode when the first power receiving electrode faces the first power transmitting electrode and a second power receiving electrode that forms a capacitive coupling with the second power transmitting electrode when the second power receiving electrode faces the second power transmitting electrode. The wireless electric power transfer system transfers the AC power from the electric power transmission device to the electric power reception device via the two capacitive couplings wirelessly.

The technology of the present disclosure can be applied to any device driven by electric power. For example, the technology can be applied to a transport robot, such as an automated guided vehicle (AGV) used in a factory or an electric vehicle.

What is claimed is:

1. An electric power transmission device comprising:
   a first power transmitting electrode having a planar surface;
   a second power transmitting electrode having a planar surface and spaced from the first power transmitting electrode in a first direction that extends along the surface of the first power transmitting electrode;
   a power transmission circuit electrically connected to the first and second power transmitting electrodes and outputting AC power to the first and second power transmitting electrodes;
   a conductive first shield disposed between the first power transmitting electrode and the second power transmitting electrode, and spaced from each of the first power transmitting electrode and the second power transmitting electrode;
   a conductive second shield spaced from each of the first and second power transmitting electrodes in a second direction perpendicular to the surface of the first power transmitting electrode, the second shield covering at least one of a first gap between the first power transmitting electrode and the first shield or a second gap between the second power transmitting electrode and the first shield, the second shield having at least three portions arranged in the first direction, the at least three portions including a first portion that covers one of the first and second gaps, a second portion that is spaced from the first portion by a third gap and that faces one of the first and second power transmitting electrodes, and a third portion that is spaced from the first portion by a fourth gap and that faces the first shield; and
   a conductive third shield spaced from the second shield in the second direction, the third shield covering at least one of the third gap or the fourth gap.

2. The electric power transmission device according to claim 1, wherein each of the first power transmitting electrode and the second power transmitting electrode extends in a third direction perpendicular to each of the first and second directions.

3. The electric power transmission device according to claim 2, wherein at least one of the first shield, the second shield, or the third shield extends in the third direction.

4. The electric power transmission device according to claim 1, wherein the surface of the first power transmitting electrode and the surface of the second power transmitting electrode are coplanar.

5. The electric power transmission device according to claim 1, wherein the second shield covers both the first gap and the second gap.

6. The electric power transmission device according to claim 1, wherein the second shield includes at least six portions arranged in the first direction,
   wherein the at least six portions include the first portion, the second portion, the third portion, a fourth portion, a fifth portion, and a sixth portion, and
   wherein the first portion covers the first gap, the second portion is spaced from the first portion by the third gap and faces the first power transmitting electrode, the third portion is spaced from the first portion by the fourth gap and faces the first shield, the fourth portion covers the second gap, the fifth portion is spaced from the fourth portion by a fifth gap and faces the second power transmitting electrode, the sixth portion is spaced from the fourth portion by a sixth gap and faces the first shield, and the third shield includes four portions spaced from each other, each of the four portions covering a respective third to sixth gaps.

7. The electric power transmission device according to claim 1, further comprising:
   a conductive fourth shield spaced from the first and second power transmitting electrodes in a direction opposite to the second direction, wherein the fourth shield covers at least one of the first or second gaps.

8. The electric power transmission device according to claim 7, wherein the fourth shield includes a portion that covers the first gap and a portion that covers the second gap.

9. The electric power transmission device according to claim 7, wherein the fourth shield includes at least six portions arranged in the first direction,
wherein the at least six portions include a seventh portion that covers the first gap, an eighth portion that is spaced from the seventh portion by a seventh gap and that faces the first power transmitting electrode, a ninth portion that is spaced from the seventh portion by an eighth gap and that faces the first shield, a tenth portion that covers the second gap, an eleventh portion that is spaced from the tenth portion by a ninth gap and that faces the second power transmitting electrode, and a twelfth portion that is spaced from the tenth portion by a tenth gap and that faces the first shield, and
wherein the electric power transmission device further comprises a conductive fifth shield spaced from the fourth shield in the direction opposite to the second direction, and the fifth shield includes four portions spaced from each other, each of the four portions of the fifth shield covering a respective seventh to tenth gaps.

10. A wireless electric power transfer system comprising:
the electric power transmission device according to claim 1; and
an electric power reception device, wherein the electric power reception device includes a first power receiving electrode that forms a first capacitive coupling with the first power transmitting electrode when the first power receiving electrode faces the first power transmitting electrode and a second power receiving electrode that forms a second capacitive coupling with the second power transmitting electrode when the second power receiving electrode faces the second power transmitting electrode, and
wherein the wireless electric power transfer system transfers the AC power from the electric power transmission device to the electric power reception device via the first and second capacitive couplings wirelessly.

* * * * *